United States Patent [19]

Chang

[11] Patent Number: 5,177,970

[45] Date of Patent: Jan. 12, 1993

[54] REFRIGERATOR OF AIR CONDITIONER BASED ON A FLUID OF ELECTRIC DIPOLES

[75] Inventor: David B. Chang, Tustin, Calif.

[73] Assignee: Hughes Aircraft Company, Los Angeles, Calif.

[21] Appl. No.: 659,669

[22] Filed: Feb. 25, 1991

[51] Int. Cl.⁵ .............................................. F25B 21/00
[52] U.S. Cl. ...................................... 62/3.1; 62/467; 165/96
[58] Field of Search ........................ 62/3.1, 467; 55/2; 165/96

[56] References Cited

U.S. PATENT DOCUMENTS 3,448,791 6/1969 Clark ....................................... 62/3.1

Primary Examiner—Ronald C. Capossela
Attorney, Agent, or Firm—Michael W. Sales; Wanda K. Denson-Low

[57] ABSTRACT

A refrigeration apparatus wherein the working fluid is a suspension of electric dipoles. The apparatus conducts the fluid from the region to be cooled to a heat exchanger, and employs different fluid conduit geometries. The fluid conduits present the fluid to the region to be cooled in a cold unaligned state, whereupon the fluid absorbs energy from the region and is heated. The dipoles in this warmed fluid are then aligned in another region by the conduit geometry, and the fluid becomes hot as a result of this alignment. The heated fluid with the aligned fluid is then cooled in the heat exchanger, and the cooler aligned dipole fluid becomes even cooler when the fluid flows to a region where the dipoles can no longer maintain their alignment and the process then repeats. The alignment and unalignment of the dipoles in the fluid is controlled by the geometry of the fluid container. In the aligned region, the conduits are cylindrical or planer; in the unaligned region, the conduits are spherical. No compression of the fluid is required.

17 Claims, 1 Drawing Sheet

_(5,177,970)_

REFRIGERATOR OF AIR CONDITIONER BASED ON A FLUID OF ELECTRIC DIPOLES

BACKGROUND OF THE INVENTION

The present invention relates to the refrigeration field, and more particularly to a refrigeration apparatus which operates with a working fluid of electric dipoles.

Conventional working fluids in refrigerators make use of a phase change from liquid to vapor; such refrigerators typically require compressors. There are also thermoelectric coolers based on the Peltier effect, but the capacity of these are limited and their coefficients of performance are low. Such thermoelectric coolers are described in the CRC Handbook for Applied Engineering Science, Second Edition, 1973, at page 582.

A big problem facing the refrigeration industry today is how to comply with the environmental regulations calling for the phasing out of Freons.

It is therefore an object of the present invention to provide a refrigeration device which does not employ freon as a working fluid.

Another object is to provide refrigeration device which does not employ a compressor.

SUMMARY OF THE INVENTION

A refrigeration apparatus employing a working fluid comprising electric dipoles is described. The apparatus comprises fluid conduit means for carrying the working fluid in a closed loop between a first area to be cooled by the apparatus and a second area to which heat will be exchanged.

The apparatus further includes means for pumping the working fluid through said conduit, and heat exchanger means disposed at the second area for exchanging heat from the working fluid to the ambient.

In accordance with the invention, the fluid conduit means is characterized by respective first and second geometries at the first and second areas, wherein the first geometry does not permit self-alignment of the working fluid dipoles, and the second geometry permits self-alignment of the fluid dipoles. The dipoles comprising the working fluid change state from an aligned condition to an unaligned condition when passing from the second geometry conduit to the first geometry conduit, thereby taking up heat from the fluid and cooling the fluid. The cooled fluid takes up heat from said first area and is thereby warmed. The warmed fluid is heated further by the change of the dipole state from an unaligned condition to an aligned condition upon passing from the first geometry conduit to the second geometry conduit, and the heated fluid is cooled by operation of said heat exchanger.

A refrigeration method for cooling a space in accordance with the invention is described, and comprises the following steps:

circulating a working fluid in a fluid conduit through a closed loop between a first region to be cooled and a second region to which heat from the fluid will be exchanged to the ambient, and wherein the working fluid comprises a suspension of particles in a base fluid, the particles characterized by an electric dipole moment;

causing the electric dipoles to become randomly oriented in the vicinity of the first region, thereby taking up heat from the first region and warming the fluid; and causing alignment of the electric dipoles in the vicinity of the second region, thereby absorbing heat from and cooling the working fluid.

BRIEF DESCRIPTION OF THE DRAWING

These and other features and advantages of the present invention will become more apparent from the following detailed description of an exemplary embodiment thereof, as illustrated in the accompanying drawings, in which.

DETAILED DESCRIPTION OF THE PREFERRED EMBODIMENT

Overview of the Invention

Figure 1:
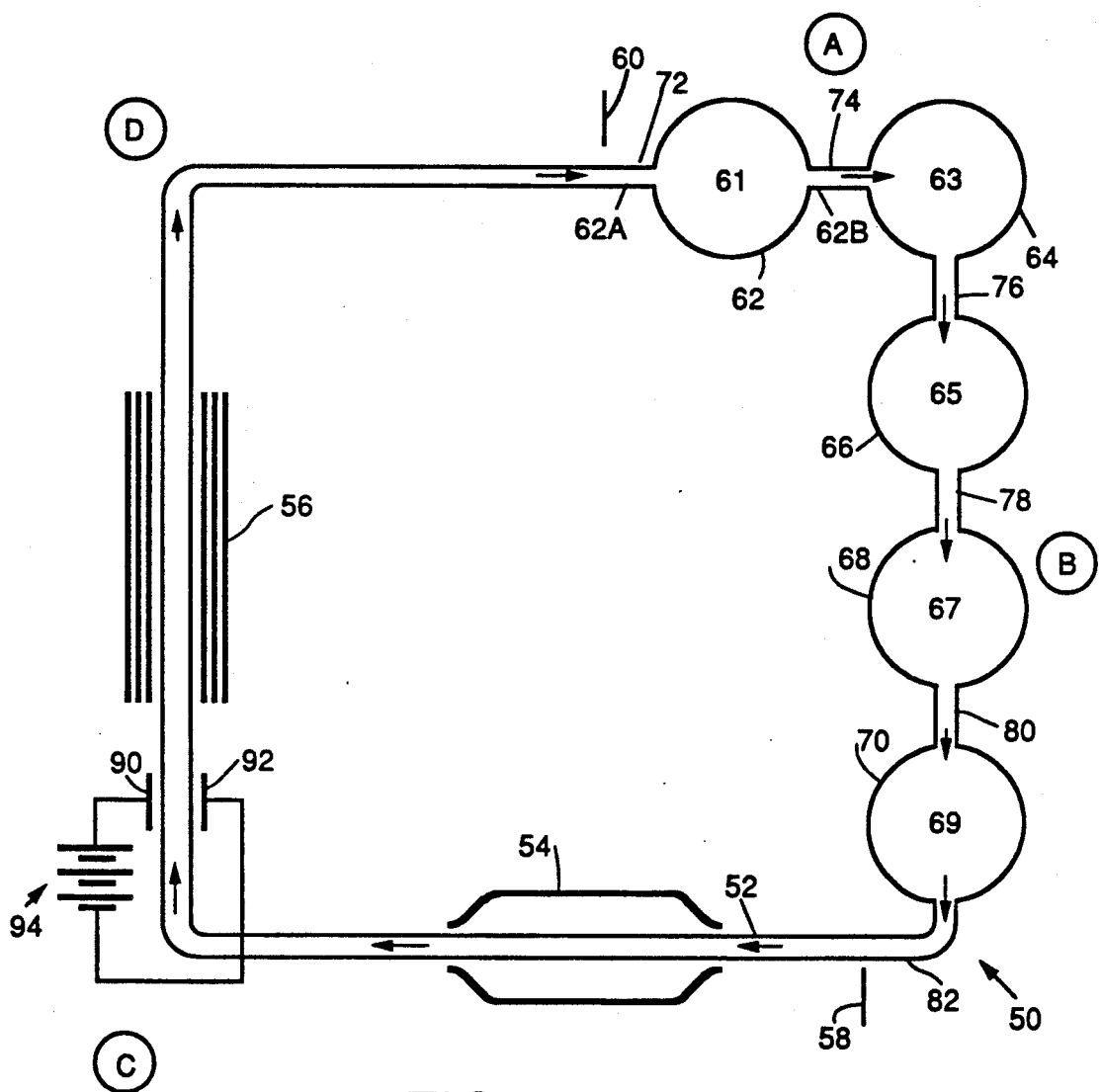
FIG. 1 is a simplified block diagram of a refrigeration system employing the invention.

A refrigeration apparatus is disclosed in which the working fluid is a suspension of electric dipoles in a base fluid. In brief summary, the invention uses self alignment phenomenon, an external electric field and conduit geometry to cause alignment of the electric dipoles. Self alignment phenomenon and conduit geometry (cylindrical or planar) cause alignment below a critical temperature. An external electric field can be applied to assist the dipoles to align. A different conduit geometry, such as a spherical volume region, is used to cause non-alignment of the dipoles. Dipole size is also important in determining the critical temperature, and thus alignability of the dipoles. When geometry of the fluid conduit permits, the dipoles are self-aligned, i.e., the dipoles by virtue of their mutual electrostatic interactions will tend to be oriented in the same direction, at temperatures T below a critical temperature $T_c$, with the energy released per dipole by the alignment being $\sim 3K_B T_c$, where $K_B$ is Boltzmann's constant. This compares favorably with the heat of condensation of normal fluids used in conventional refrigerators. The refrigerator operates at $T < T_c$ in the following manner. The flowing fluid presents the dipoles to the region to be cooled in a cold unaligned state, whereupon the fluid absorbs energy from the region and is heated. The dipoles in this warmed fluid are then aligned in another fluid conduit region and the fluid becomes hot as a result of this alignment. This heated fluid with the aligned dipoles is then cooled by radiating away the heat. The cooler aligned dipole fluid next becomes even cooler when the fluid flows to a region fluid conduit where the dipoles can no longer maintain their alignment, and the process then repeats.

An important aspect of the invention is that alignment and unalignment of the electric dipoles suspended in the fluid is controlled by the geometry of the fluid container. In the aligned region the fluid conduits are cylindrical or planar; in the unaligned region the conduits are spherical. In a refrigeration apparatus in accordance with the invention, no compression is required since the phase change in the working fluid which results in cooling is not from liquid to vapor, but is simply the orientation and randomization of electric dipoles in the fluid.

The basis for refrigeration apparatus in accordance with the invention is the spontaneous orientation of electric dipoles which are free to be realigned due to their mutual interactions. Debye has described this situation through the following equations (see, e.g., C. Kittel, *Introduction to Solid State Physics*, 3rd Edition, New York, John Wiley & Sons (1967)):

$$P = NpL(pE/k_BT) \quad (1)$$

$$E = \Gamma P \quad (2)$$

where $\Gamma = 4\pi/3$ for dipoles in a cubic lattice, N is the number of dipoles per unit volume, p is the magnitude of each dipole moment, P is the polarization per unit volume, $k_B$ is Boltzmann's constant, T is the temperature, and E is the electric field due to the other dipoles acting on a dipole. Note that as T→0, P→Np.

L(x) is the Langevin function, $$L(x) = ctnh(x) - (1/x) \quad (3)$$

For P→0, eq. 1-3 give $$1 = (Np^2\Gamma/3k_BT_c),$$

i.e., the dipoles will be randomly oriented for temperatures larger than $$T_c = (Np^2\Gamma/3k_B) \quad (5)$$

or for $T < T_c$ when the alignment field E is prevented from forming.

For this invention, the important results of these equations are:
1. At $T_c$, the dipole are randomly oriented.
2. At $T << T_c$, the dipoles are oriented, i.e., pointed in the same direction, and the energy/dipole released is $pE = p\Gamma Np$.
3. At E=0, the dipoles are randomly oriented.

The parameter p can be written as $$p = el \quad (6)$$

where e denotes the electronic charge on the dipole, and l is the characteristic length of the dipole. N can be written as:

$$N = 1/L^3_p \quad (7)$$

where $L_P$ is the typical distance between the dipoles in the liquid. Then $$T_c = (e^2l^2/k_BL^3)(\Gamma/3) \quad (8)$$

For the refrigerator to work for temperatures around room temperature, then $T_c > 300°K$. In that case, the following are possible parameters:

| | |
|---|---|
| for l = $10^{-8}$ cm, | L = $10^{-7}$ cm. |
| for l = $10^{-7}$ cm, | L = $10^{-6.3}$ cm. |
| for l = $10^{-6}$ cm, | L = $10^{-6}$ cm. |

Moreover, at lower temperatures where the dipoles are aligned, $$pE = p^2\Gamma N = (e^2l^2\Gamma/L^3) = (e^2\Gamma k_BT_c/e^2)$$
$$(3/\Gamma) = 3k_BT_c \quad (9)$$

Thus, for $T_c = 300°K$, $pE = 3/40$ eV per dipole. This compares favorable with the condensation energy of ~1/10 eV per molecule for conventional working fluids for refrigerators based on vapor-to-liquid phase change. An orienting field can be applied to make pE larger, and provide more "condensation" energy. Such an orienting field can be applied by applying a voltage between two opposing electrically conductive plates straddling the region coupled by the dipoles. Thus, for example, as shown in FIG. 1, the plates 90 and 92 straddle the conduit 52, and voltage source 94 applies a voltage between the two plates to apply an orienting electric field to the dipoles passing between the two plates. In this case, the portion of the conduit 52 which passes between the two plates 90 and 92 must be fabricated of an electrically nonconductive material, in order for the electric field to have an effect on the fluid dipoles.

$$p(E_{applied} + E_{dipoles}) = pE_{applied} + 3k_BT_c \quad (10)$$

In a preferred embodiment of a refrigerator embodying the invention, alignment and randomization of dipole orientation is controlled by the geometry of the conduits through which the fluid is pumped. Thus, the $\Gamma$ in the Debye expression $E = \Gamma P$ defining the alignment field E really depends on the geometry of the container of the fluid. In Kittel's *Introduction to Solid State Physics*, i.d., at page 380, it is shown that:

| | |
|---|---|
| 1. E = $(4\pi/3)$P | for a thin slab in which P is parallel to the surface; |
| 2. E = $-(8\pi/3)$P | for a thin slab in which P is perpendicular to the surface; |
| 3. E = $(4\pi/3)$P | for a thin slab in which P is perpendicular to the surface, when a metal film on the top and bottom surfaces are short circuited; and |
| 4. E = 0 | for a spherical enclosure. |

Self-alignment would occur for cases (1) and (3), but not for cases 2 and 4, even when $T < T_c$. A cylindrical metal pipe is not too different from cases 1 and 3; only the numerical factor differs.

The invention further takes the form of a refrigeration method for cooling a space, comprising the following steps:

circulating a working fluid in a fluid conduit through a closed loop between a first region to be cooled and a second region to which heat from the fluid will be exchanged to the ambient, and wherein the working fluid comprises a suspension of particles in a base fluid, the particles characterized by an electric dipole moment;

causing the electric dipoles to become randomly oriented in the vicinity of the first region, thereby taking up heat from the first region and warming the fluid; and causing alignment of the electric dipoles in the vicinity of the second region, thereby absorbing heat from and cooling the fluid.

An Exemplary Embodiment

An embodiment of the proposed refrigerator/air conditioner is shown in FIG. 1 for a fluid always at $T < T_c$. The refrigeration apparatus 50 is to cool a region generally designated as "B" in FIG. 1. The apparatus includes a pump 54 for pumping the working fluid through a series of pipe conduits and spherical cavities in a clockwise direction. The pump 54 can be, e.g., of the type used in swimming pools or aquariums. The pipe 52 between points 58 and 60 (in a clockwise direction) is metal pipe conduit. The pipe 52 flows to a radiator or heat exchanger 56 for cooling the fluid carried in the pipe. Thus, in a simple case, the radiator 56 might comprise a plurality of metal fins connected to the outside surface of the pipe 52 for conducting some of the heat energy of the fluid away to the ambient.

The refrigerator apparatus 50 further comprises a series of spherical cavities 61, 63, 65, 67 and 69 defined respectively by spherical enclosures 62, 64, 66, 68 and 70 fabricated of electrically nonconducting material such as a strong, durable plastic such as polyvinylchloride (PVC). Each spherical enclosure comprises an inlet port and an outlet port. For example, enclosure 62 comprises an inlet port 62A and an outlet port 62B. The respective enclosures are connected in series by electrically nonconducting pipes 72, 74, 76, 78, 80 and 82. Pipe 72 connects to the outlet end of pipe 52, and pipe 82 connects to the inlet end of pipe 82. The electrically nonconducting pipes can be fabricated, for example, of PVC.

The spherical enclosures provide a fluid conduit geometry (case 4 above) which does not permit self-alignment of the dipoles in the fluid therein. The pipes 74, 76, 78 and 80 between the spherical enclosures should be kept short to prevent dipole self-alignment. Of course, these pipes could be removed altogether, and the spherical enclosures 62, 64, 66, 68 and 70 brought adjacent one another, with the outlet port of one communicating directly with the inlet port of the next spherical enclosure.

The refrigeration apparatus 50 operates in the following manner.

At region "A" the dipoles are unaligned due to the cylindrical geometry of the fluid conduit and the working fluid is cool.

At region "B," the region to be cooled, the dipoles are unaligned and the fluid is warmer by virtue of absorbing energy from the (warm) region B to be cooled.

At area "C" the dipoles self-align because $T<T_c$ and the cylindrical geometry of the pipe 52 allows the self-alignment field to form. The self-alignment heats the fluid because $\leq 3k_BT_c$ is released by each dipole on alignment.

At area "D" the dipoles are still aligned but cooler than at area C because the excess heat has been radiated (or conducted or convected) away at the heat exchanger 56.

In moving from area D to area A, the dipoles are randomized in orientation because the geometry of container 62 no longer allows an alignment local field to form. The randomization absorbs energy from the fluid so the fluid is cooled.

The electric dipole fluid can be made of fluids containing many different kinds of materials which have permanent dipole moments. For instance, a colloidal suspension of Barium Titanate particles or of polyvinylidine fluoride particles in a base fluid, e.g., water, could be used as the working fluid.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A refrigeration apparatus employing a working fluid comprising electric dipoles, said apparatus comprising:

fluid conduit means for carrying said working fluid between a first area to be cooled by said apparatus and a second area to which heat will be exchanged in a closed loop;

means for pumping said working fluid through said conduit;

heat exchanger means disposed at said second area for exchanging heat from said working fluid to the ambient; and said fluid conduit means characterized by respective first and second geometries at said first and second areas wherein said first geometry does not permit self-alignment of said working fluid dipoles, and said second geometry permits self-alignment of said fluid dipoles;

wherein said dipoles change state from an aligned condition to an unaligned condition when passing from said second geometry conduit to said first geometry conduit, thereby taking up heat from the fluid and cooling the fluid, said cooled fluid takes up heat from said first area and is thereby warmed, said warmed fluid is heated further by the change of the dipole state from an unaligned condition to an aligned condition upon passing from said first geometry conduit to said second geometry conduit, and said heated fluid is cooled by operation of said heat exchanger.

2. The refrigeration apparatus of claim 1 wherein said first geometry is characterized by one or more spherical cavities.

3. The refrigeration apparatus of claim 2 wherein said one or more spherical cavities are defined by one or more spherical enclosure elements fabricated of an electrically nonconductive material.

4. The refrigeration apparatus of claim 1 wherein said second geometry is characterized by one or more cylindrical conduit members.

5. The refrigeration apparatus of claim 1 wherein said working fluid comprises a colloidal suspension of Barium Titanate particles in a base fluid.

6. The refrigeration apparatus of claim 1 wherein said working fluid comprises a colloidal suspension of polyvinylidine fluoride particles in a base fluid.

7. The refrigeration apparatus of claim 1 wherein said working fluid comprises a suspension of particles of a material having a permanent dipole moment.

8. The refrigeration apparatus of claim 1 further comprising means for applying an orienting electrical field to the working fluid passing through at least a portion of said second conduit geometry.

9. The refrigeration apparatus of claim 8 wherein said means for applying an orienting electrical field comprises first and second opposing metal plates straddling said conduit means and a voltage source means for applying a voltage between said first and second plates.

10. A refrigeration method for cooling a space, comprising a sequence of the following steps:

circulating a working fluid in a fluid conduit through a closed loop between a first region to be cooled and a second region to which heat from said fluid will be exchanged to the ambient, and wherein said working fluid comprises a suspension of particles in a base fluid, said particles characterized by an electric dipole moment;

causing said electric dipoles to become randomly oriented in the vicinity of said first region, thereby taking up heat from said first region and warming said fluid; and causing alignment of said electric dipoles in the vicinity of said second region, thereby absorbing heat from and cooling said fluid.

11. The refrigeration method of claim 10 wherein said step of causing alignment of said electric dipoles comprises circulating said working fluid through a first conduit geometry in the vicinity of said second region which permits self-alignment of said electric dipoles, and said step of causing said magnetic dipoles to become randomly oriented comprises circulating said working fluid through a second conduit geometry in the vicinity of said first region to be cooled which does not permit self-alignment of said electric dipoles in said working fluid.

12. The refrigeration method of claim 11 wherein said first conduit geometry comprises a planar or cylindrical configuration.

13. The refrigeration method of claim 11 wherein said second conduit geometry comprises a spherical enclosure configuration.

14. The refrigeration method of claim 10 wherein said working fluid comprises a colloidal suspension of Barium Titanate particles in a base fluid.

15. The refrigeration method of claim 10 wherein said working fluid comprises a colloidal suspension of polyvinylidine fluoride particles in a base fluid.

16. The refrigeration method of claim 10 wherein said working fluid comprises a suspension of particles of a material having a permanent dipole moment.

17. The refrigeration method of claim 10 wherein said step of causing alignment of said electric dipoles comprises applying an orienting electric field to the working fluid passing through said fluid conduit in the vicinity of said second region.

* * * * *